(12) United States Patent
Travis et al.

(10) Patent No.: US 8,152,349 B2
(45) Date of Patent: Apr. 10, 2012

(54) END REFLECTOR FOR A FLAT PANEL LENS

(75) Inventors: Adrian Travis, Seattle, WA (US);
Timothy Andrew Large, Bellevue, WA (US); Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 12/354,695

(22) Filed: Jan. 15, 2009

(65) Prior Publication Data

US 2010/0177387 A1    Jul. 15, 2010

(51) Int. Cl.
*F21V 7/04* (2006.01)
*G02B 5/18* (2006.01)

(52) U.S. Cl. ........................ 362/610; 359/572

(58) Field of Classification Search ............... 359/13, 359/24, 566, 572, 630; 362/609–610, 615, 362/621–623, 625; 345/7–9; 349/62–65
See application file for complete search history.

(56) References Cited

U.S. PATENT DOCUMENTS

| 5,389,324 A | 2/1995 | Lewis et al. |
| 5,504,772 A | 4/1996 | Deacon et al. |
| 5,852,688 A | 12/1998 | Brinkman et al. |
| 5,877,874 A * | 3/1999 | Rosenberg ............ 359/15 |
| 6,553,165 B1 | 4/2003 | Temkin et al. |
| 6,905,220 B2 | 6/2005 | Wortman et al. |
| 2005/0185306 A1 | 8/2005 | Bavdaz et al. |
| 2007/0086703 A1 | 4/2007 | Kirk et al. |

FOREIGN PATENT DOCUMENTS

WO   2006082444 A2   8/2006

OTHER PUBLICATIONS

Travis, et al., "Linearity in Flat Panel Wedge Projection", retrieved at <<http://www2.eng.cam.ac.uk/~arlt1/Linearity%20in%20flat%20panel%20wedge%20projection.pdf>>, pp. 716-719.
Schmid, et al., "Subwavelength Grating Structures in Silicon-on-InsulatorWaveguides", retrieved at <<http://www.hindawi.com/GetPDF.aspx?doi=10.1155/2008/685489>>, Advances in Optical Technologies, vol. 2008, pp. 8.

* cited by examiner

*Primary Examiner* — Stephone Allen
*Assistant Examiner* — Kimberly N Kakalec
(74) *Attorney, Agent, or Firm* — Alleman Hall McCoy Russell & Tuttle LLP

(57) ABSTRACT

End reflectors, flat panel lens that may utilize the end reflector, and methods are provided. The end reflector for a flat panel lens may include a first grating having a first set of parallel planes. The first set of parallel planes may be of layers of alternating refractive indexes disposed at a first angle with a central plane of the flat panel lens. The end reflector may also include a second grating having a second set of parallel planes. The second set of parallel planes may be of layers of alternating refractive indexes of alternating refractive indexes disposed at a second angle with the central plane. The second angle may be equivalent to the first angle reflected about the central plane.

20 Claims, 6 Drawing Sheets

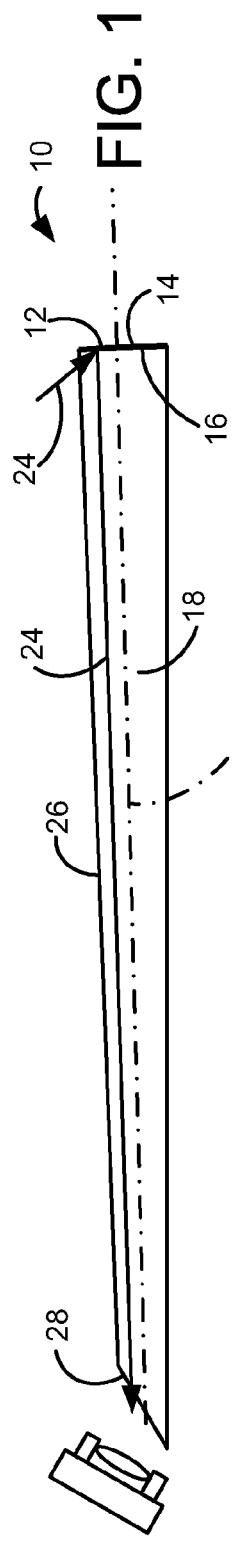
FIG. 1
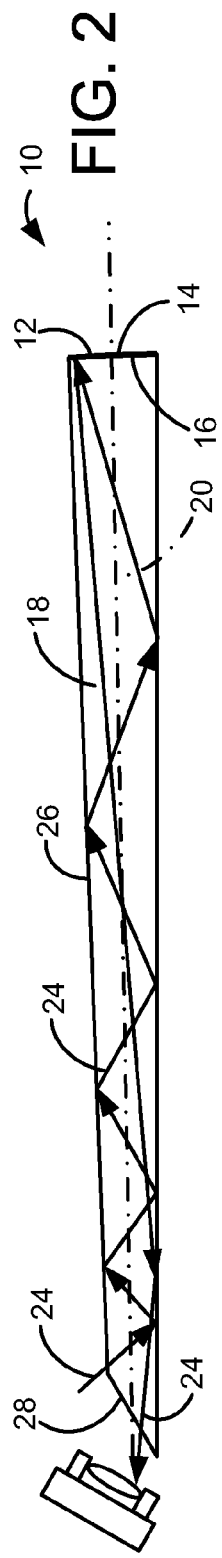
FIG. 2
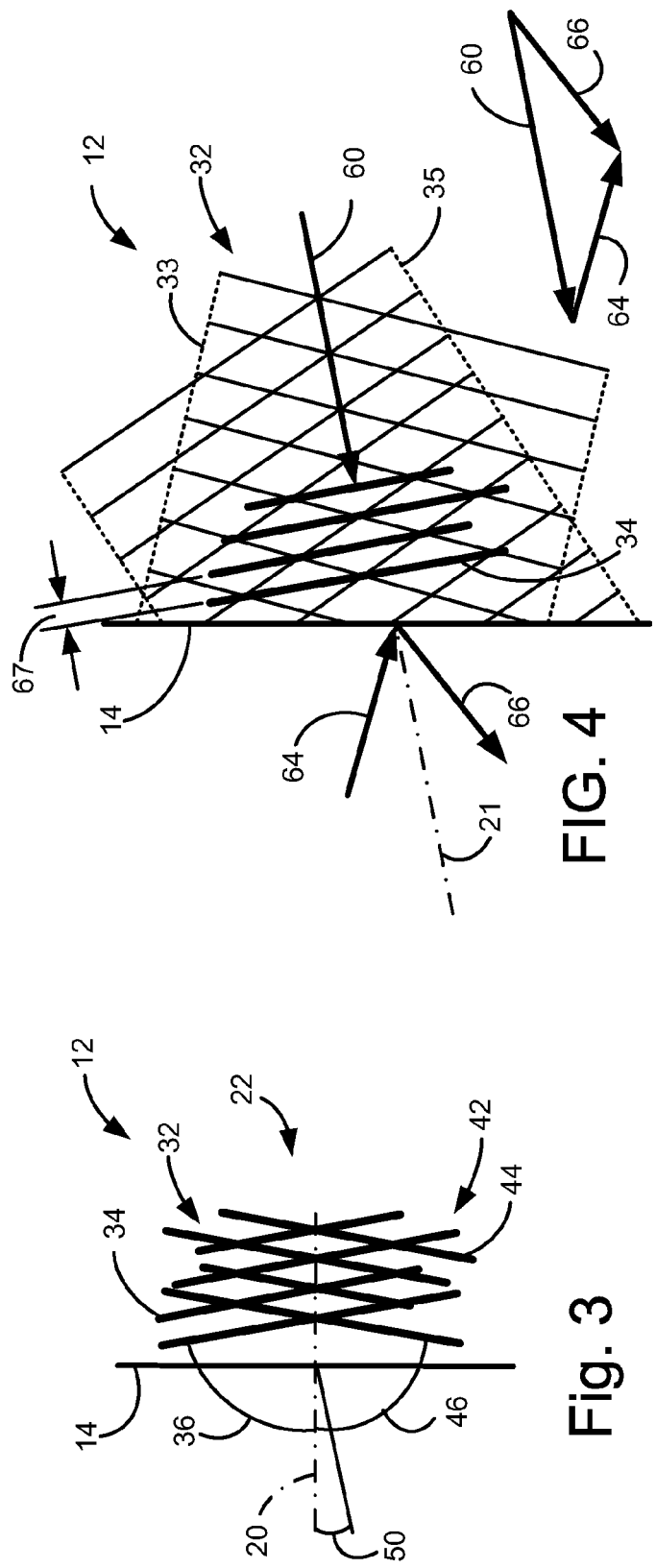

END REFLECTOR FOR A FLAT PANEL LENS

BACKGROUND

A flat panel lens may include a wedge-shaped light-transmissive material. Light rays which originate at the thin end of the wedge may fan out as they propagate inside the wedge through a series of internal reflections striking the internal surfaces at progressively increasing angles until the angle of reflection is less that the critical angle, wherein the light rays then emerge collimated from a surface of the wedge. Alternatively, the reverse path may also be used in that light which enters the wedge on the surface may be focused at the thin end. In addition to the reflections on the angled internal surfaces, the light waves may also reflect off an end reflector located at the thick end of the wedge. However, current end reflectors tend to be inefficient. Consequently some of the light propagating through the lens may be lost.

SUMMARY

The present disclosure provides for end reflectors, and flat panel lenses that may utilize the end reflectors. In one example, the end reflector for a flat panel lens may include a first grating having a first set of parallel planes. The first set of parallel planes may be formed of layers of alternating refractive indexes disposed at a first angle with a central plane of the flat panel lens. The end reflector may also include a second grating having a second set of parallel planes. The second set of parallel planes may be formed of layers of alternating refractive indexes disposed at a second angle with the central plane. The second angle may be equivalent to the first angle reflected about the central plane.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1 and 2 are schematic side views of an example light guide showing example light ray paths in accordance with the current disclosure;

FIG. 3 illustrates a detailed view of a reflector included with the light guide shown in FIGS. 1 and 2;

FIG. 4 is a detailed view illustrating one example method of forming one grating of the reflector;

DETAILED DESCRIPTION

Figure 5:
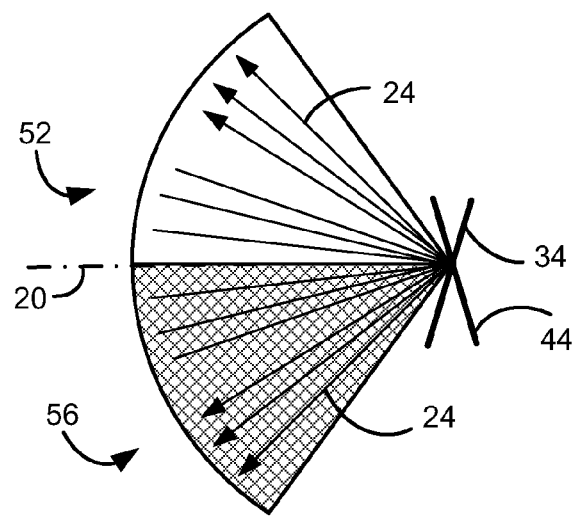
FIG. 5 is a schematic diagram illustrating improved reflective behavior of that may be made possible with various embodiments disclosed herein.

FIGS. 1 and 2 both illustrate schematic side views of an example flat panel lens 10 showing example light ray 24 paths in accordance with the current disclosure. The flat panel lens 10 may have a thick end 16, and an opposite thin end 28. FIG. 3 illustrates a detailed view of a reflector 12 located on a surface 14 of the thick end 16 of the lens 10 shown in FIGS. 1 and 2. The flat panel lens 10 may be constructed to have a depth extending normal to a plane of the page. The flat panel lens 10 may include a light guide 18 made from a light-transmissive material having a wedge-shaped profile, and a central plane 20. The reflector 12 may include first and second interleaved gratings 22 such that varying wavelengths of light may penetrate the reflector 12 to varying depths before being reflected. In addition, one or more layers of the interleaved gratings 22 may be transparent to some light rays when the light rays are incident at predetermined angles. The light rays may penetrate the one or more layers of the interleaved gratings 22, and may be reflected at a lower layer.

The light guide 18 typically is light-transmissive to visible light, though it may be configured to be transmissive of a variety of different wavelengths. In addition, the light guide 18 may be shaped, and/or structured in a variety of ways. In some examples, the light guide 18, or lens 10, may be a slab of inflexible material, and in other examples it may be flexible. In some examples the light guide 18 may be homogeneous, and/or monolithic. In other examples the light guide 18 may be non-homogeneous, and/or be implemented or constructed of multiple pieces. The light guide 18 may be clad in various materials including, in some cases air. In some examples, the cladding may have varying refractive index. In some cases the core of the light guide 18 may have varying refractive index. The light guide 18 may be substantially straight, or it may be folded. In addition, the light guide 18 may be used in various applications. For example, the light guide 18 may be configured as a flat panel display to project light from a top surface 26 thereof. In another example application, the light guide 18 may be configured as a camera, in which light incident on the top surface 26 may be focused at the thin end 28.

FIG. 1 illustrates one path of a light ray 24 of that may enter the light guide 18 near the thick end 16 of the light guide 18. FIG. 2 illustrates another path of a light ray 24 that may enter the light guide 18 near the thin end of the light guide 18. For clarity, two figures are illustrated, though both light rays could be illustrated in the same figure. In general, it will be appreciated that multiple rays of light may be simultaneously transmitted through the light guide. Various reflectors 12 constructed in accordance with the present disclosure may enable a light ray 24 that enters the light guide near the thick end 16 to be deflected substantially parallel with the central plane 20. Further, reflectors 12, constructed in accordance with various example embodiments, may enable collimated light rays incident on the top surface 26 to emerge focused at the thin end 28 without significant loss of light.

As illustrated in FIG. 3, the first and second interleaved gratings 22 of the flat panel lens 10 may include a first grating 32 having a first set of parallel planes 34, and a second grating 42 having a second set of parallel planes 44. The first set of parallel planes 34 may be constructed of alternating refractive indexes, and may be disposed at a first angle 36 with the central plane 20 of the flat panel lens 10. The second set of parallel planes 44, of second grating 42, may also be constructed of alternating refractive indexes, that may be disposed at a second angle 46 with the central plane 20. The second angle 46 may be equivalent to the first angle 36 reflected about the central plane 20.

A surface angle 50 may define the angle that the first set of parallel planes 34 makes with the surface 14. Surface angle 50 may also be considered to be the first angle 36, as measured relative to the surface 14 of the thick end 16. The surface angle 50 may be substantially equal to half the angular difference between 90 degrees and a critical angle of the light-transmissive material.

FIG. 4 is a detailed view illustrating the first grating 32 of the reflector 12. The first grating 32 may be a Bragg grating that may be configured to convert an incident light ray 64 into a reflected light ray 66 reflected about a reflection axis 21. The layers of the first grating 32 may coincide with, and may be formed by, intensity contours of superposed waves forming a first interference pattern of a first wave 33 travelling in the direction of the incident light ray 64, and a second wave 35 travelling in a direction opposite to the direction desired for reflection, i.e. in the direction opposite the reflected light ray 66. The process of superposing waves may be repeated for waves at other angles of incidence. Each wave may be configured to produce a reflection about refection axis 21. The second grating 42 (FIG. 3) may also be a Bragg grating that may be formed similarly by superposing waves at predetermined angles to form a second interference pattern interleaved with the first interference pattern. It will be understood the first grating 32 and the second grating 42 may also be formed using other techniques.

The direction, and period, of the first grating 32 may be quantified by a grating vector 60 whose length equals the periodicity of the first grating 32 and whose direction is perpendicular to the parallel planes 34 of the first grating 32. The grating vector 60 may be configured to be equal to the vector difference between the incident light ray 64 vector, and the reflected light ray 66 vector. In accordance with some examples, the multilayer grating 22 may not need to be infinitely deep since the incident light ray 64 may be reflected before it may penetrate too far into the grating 22. In some examples, the grating pitch, or spacing 67 between the adjacent planes may be selected such that the reciprocal of the grating pitch may equal twice the reciprocal of the wavelength times the cosine of the angle between the incident wave and the reflected wave.

FIG. 5 is a schematic diagram illustrating improved reflective behavior of the reflector 12 constructed in accordance with the present disclosure. A first plane 34 is shown interleaved with a second plane 44. Light rays 24 that may be incident from positive angles 52, relative to the central plane 20, may be reflected off the first plane 34, and light rays 24 incident from negative angles 56, relative to the central plane 20, may be reflected off the second plane 44. Substantially all the light incident on either the first plane 34, or the second plane 44, may be effectively transferred through the light guide 18. In addition, reflectors 12 constructed in accordance with the present disclosure may provide improved discrimination between light rays 24 incident at angles that are slightly greater than, or slightly less than the angle of the central plane 20. For example, a light ray 24 incident at 1 deg to the surface normal may be reflected off a predetermined layer in the grating 22, at an angle greater than 1 deg, for example 16 deg.

Figure 6:
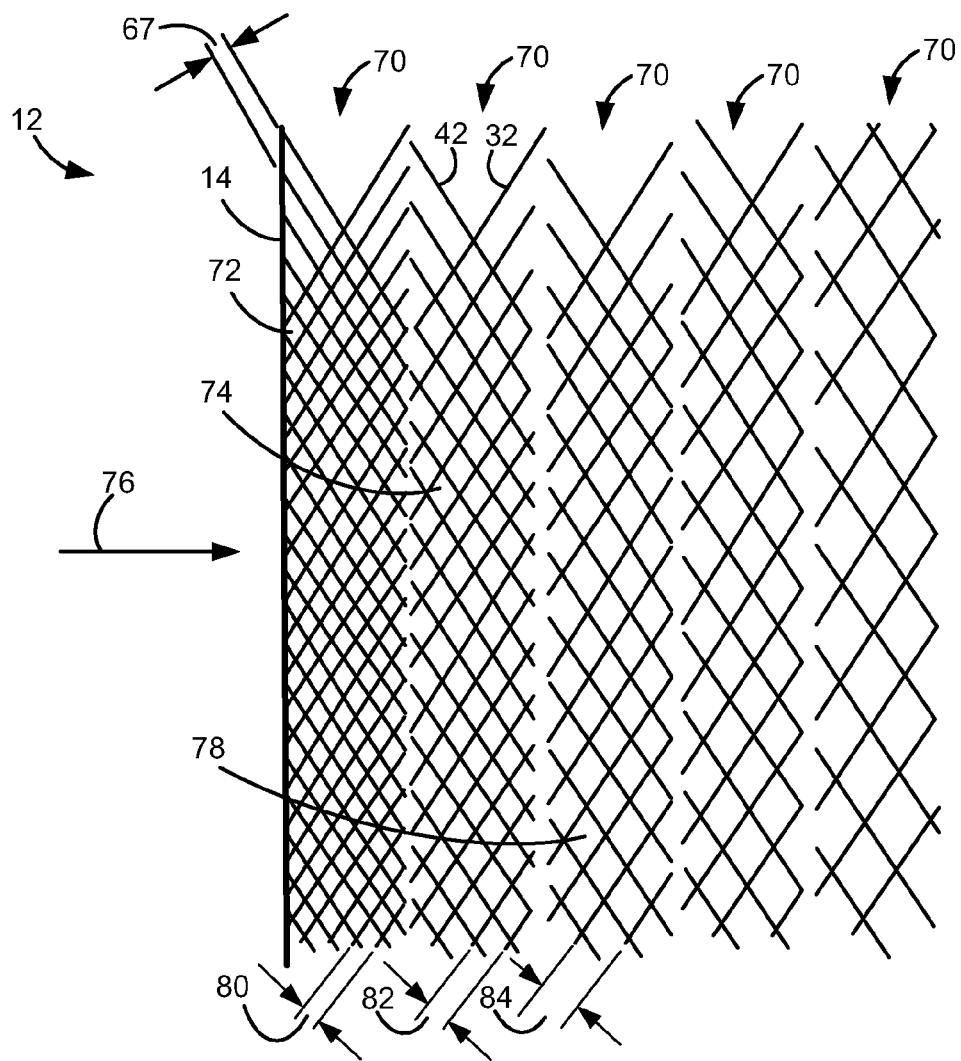
FIG. 6 is a schematic representation of an example reflector that may be included with the light guide shown in FIGS. 1 and 2.

FIG. 6 is a schematic representation of one example reflector 12. In some examples, the spacing 67 between adjacent planes of each of the first grating 32 and second grating 42 may be increased a preselected amount in accordance with a distance from the thick end 16 of the light guide 18 extending in a direction away from the thin end 28 of the light guide 18. In some examples, the spacing 67 between each of the first parallel planes 34, and the second parallel planes 44, of each grating may gradually increase with an increasing distance from the thick end 16 of the light guide extending in a direction away from the thin end 28 of the light guide 18. In other examples, the spacing 67 between adjacent planes may be the same or similar within groups of planes, but different from group to group.

In the example illustrated in FIG. 6, each of the first grating 32 and the second grating 42 may include two or more groups 70 of parallel planes. In particular, five groups 70 of parallel planes are shown in the present example, though various numbers of groups 70 are possible. A first group 72 of the two or more groups 70 of parallel planes may be closer to the thick end 16 of the light guide 18 than a second group 74 of the two or more groups 70 of parallel planes as measured in a direction 76 away from the thin end 28 of the light guide 18. The second group 74 of the two or more groups 70 of parallel planes may be closer to the thick end 16 of the light guide than a subsequent group 78 of parallel planes as measured in the direction 76 away from the thin end of the light guide, when a subsequent group 78 of parallel planes is present. Each adjacent layer within the first group 72 may be a first group spacing 80 apart, and each adjacent layer within the second group 74 may be a second group spacing 82 apart. The second group spacing 82 may be greater than the first group spacing 80. If present, each adjacent layer within the subsequent group 78 may be further apart, i.e. a subsequent group spacing 84, than the first group spacing 80 and the second group spacing 82.

Various examples may provide a reflector 12 wherein at the surface thereof, next to the light guide 18, the periodicity of both gratings may be sufficient to reflect rays incident perpendicular to the grating at the shortest wavelength of blue light expected. As one example, approximately 5 microns deeper into the structure, the periodicity of both gratings may be increased equally so that they reflect blue rays of light incident at a small angle to the perpendicular, or greener rays of light parallel to the grating perpendicular. The obtained blue rays and all rays of longer wavelengths may have passed through the top few microns of the reflector because the pitch of both gratings may be too high for reflection to take place.

As discussed, the periodicity of both gratings may increase with increasing depth of the structure. At the depth reached by only the most oblique of the blue light rays, some may be incident perpendicular to the surface of the reflector, and may therefore, be split so that half is reflected by each grating. Deeper than this may be planes capable of reflecting blue light rays from positive to negative angles or vice versa. However, blue light rays may not get this deep so unwanted reflections may be avoided. Green light may penetrate deeper into the grating before it is reflected, and red light may penetrate deeper still. All rays may otherwise be reflected in a similar manner to that outlined for blue.

Figure 7:
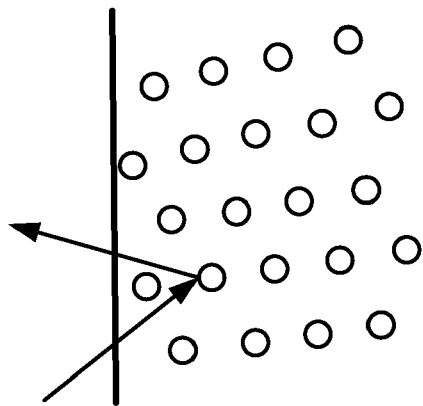
FIG. 7 is a schematic drawing illustrating an example form of construction of the reflector disclosed herein.

FIG. 7 is a schematic drawing illustrating an example method of construction of the flat panel lens 10. In this example, the first and second interleaved gratings 22 may be formed from holes 90 drilled in a pre-form pattern. The pre-form pattern may be similar to, but larger than, a final pattern corresponding to locations of intersections of the first parallel planes 34 and the second parallel planes 44. The pre-form may then be stretched in a direction parallel to an axis of one of the holes 90 to reduce the pre-form pattern, as measured in a plane normal to the axis of one of the holes 90 to form the final pattern.

Another example method of construction may include the first grating 32 and the second grating 42 being are formed from polymerized filaments arranged in a pattern corresponding to the locations of the intersections of the first parallel planes 34, and the second parallel planes 44. The filaments may be formed from a monomer that has been forced through holes in a plate.

Another example method of construction may include the first grating 32 and the second grating 42 being formed from a series of stacked films of an optically cured polymer sequentially dropped onto a spinning disc. The stacked films may have been exposed to superposed plane waves in sequence after each respective polymer has been dropped onto the spinning disc. The superposed plane waves may have a wavelength that may be selectively increased according to a height of the stacked films.

Figure 8:
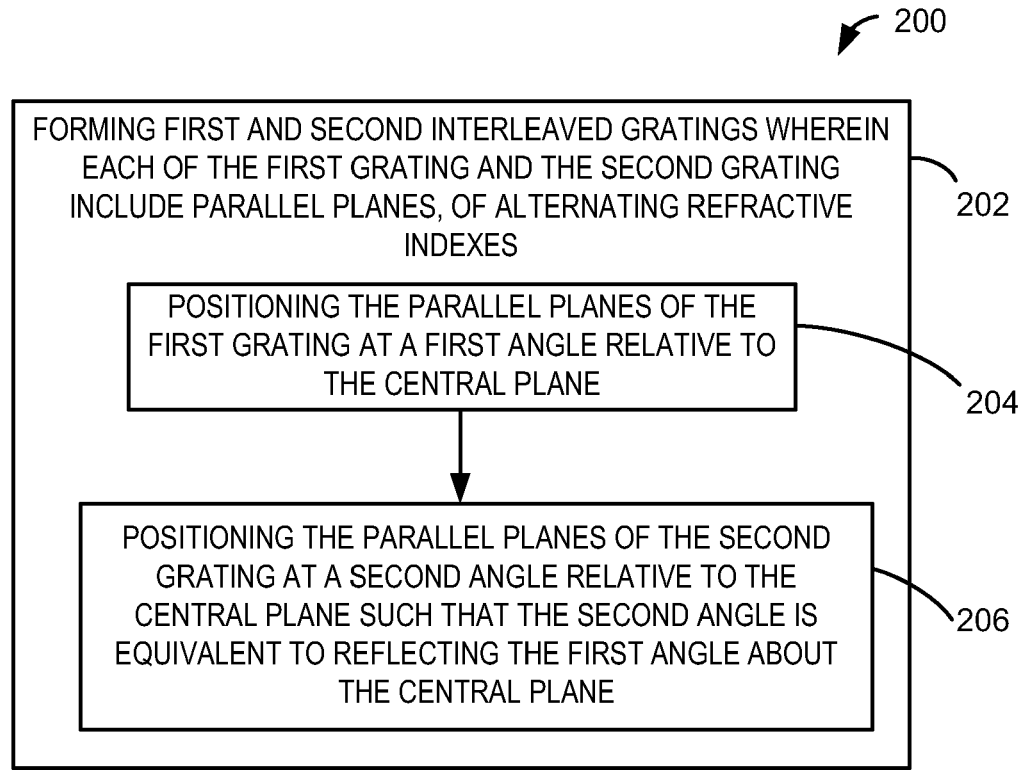
FIGS. 8 through 15 are flowcharts illustrating example methods of forming a reflector at a thick end of a flat panel lens.

FIG. 8 is a flowchart illustrating an embodiment of an example method 200 for forming a reflector at a thick end of a flat panel lens. The flat panel lens may have a central plane. Method 200 may be implemented using systems and devices described above. The method 200 may include, at 202, forming first and second interleaved gratings, wherein each includes parallel planes of alternating refractive indexes. The forming 202 may include, at 204, positioning the parallel planes of the first grating at a first angle relative to the central plane. The forming may also include, at 206, positioning the parallel planes of the second grating at a second angle relative to the central plane such that the second angle may be equivalent to reflecting the first angle about the central plane.

Figure 9:
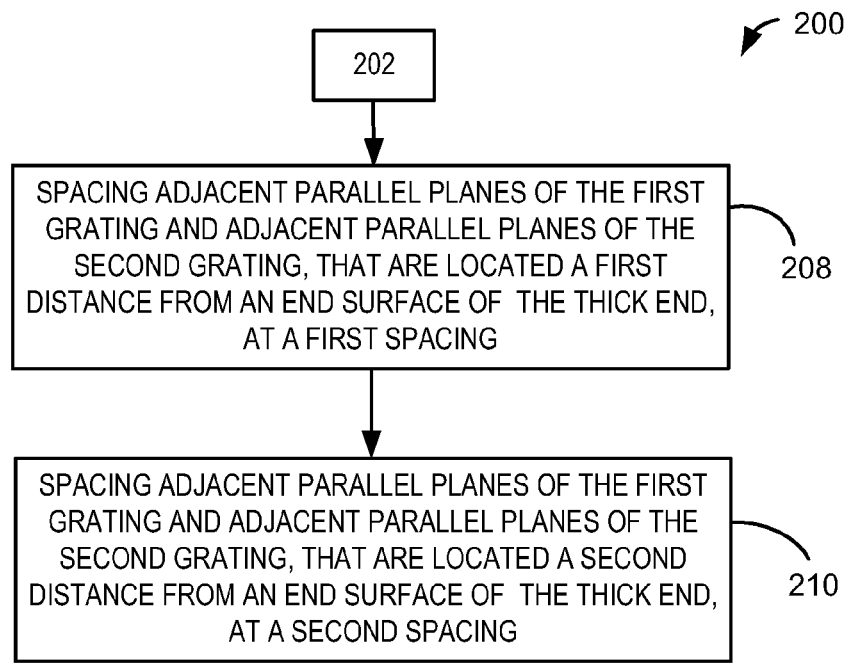

FIG. 9 is a flowchart illustrating an example variation of the method 200. The method 200 may include, at 208, spacing adjacent parallel planes of the first grating and adjacent parallel planes of the second grating, that may be located within a first range of distances from the thick end, at a first spacing. The method 200 may also include, at 210, spacing adjacent parallel planes of the first grating and adjacent parallel planes of the second grating, that may be located with a second range of distances, from the thick end, at a second spacing.

Figure 10:
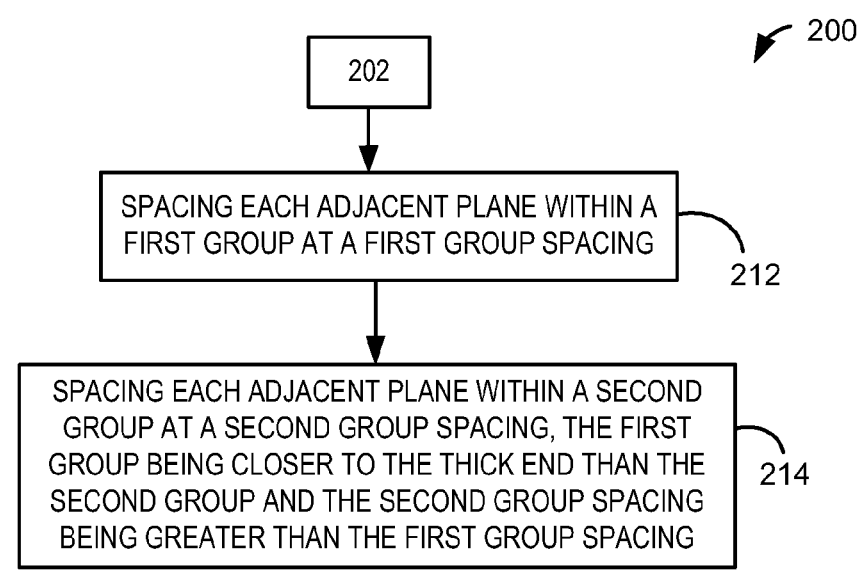

FIG. 10 is a flowchart illustrating another example variation of the method 200. The method 200 may include, at 212, spacing each adjacent plane within a first group at a first group spacing. The method 200 may also include, at 214, spacing each adjacent plane within a second group at a second group spacing, the first group being closer to the thick end than the second group, and the second group spacing being greater than the first group spacing.

Figure 11:
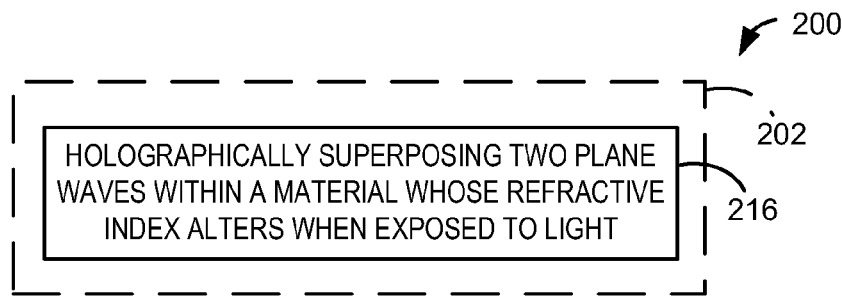

FIG. 11 is a flowchart illustrating another example variation of the method 200. In this example, the forming first and second interleaved gratings 202, as shown in FIG. 7, may include, at 216, holographically superposing two plane waves within a material whose refractive index alters when exposed to light.

Figure 12:
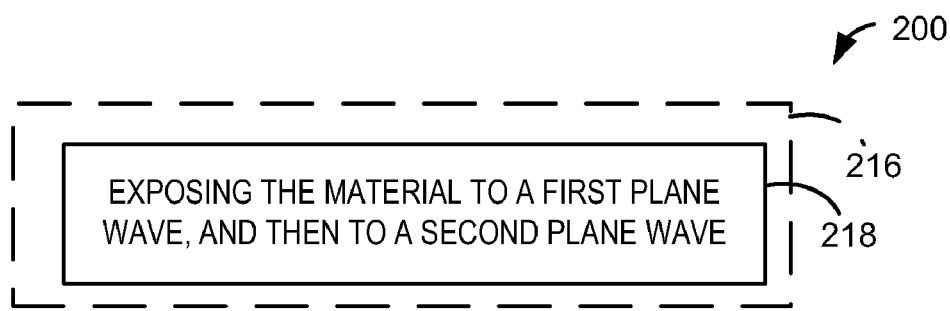

FIG. 12 is a flowchart illustrating another example variation of the method 200 shown in FIG. 10. In this example, the holographically superposing two plane waves within the material 216 may include, at 218, exposing the material to a first plane wave, and then to a second plane wave.

Figure 13:
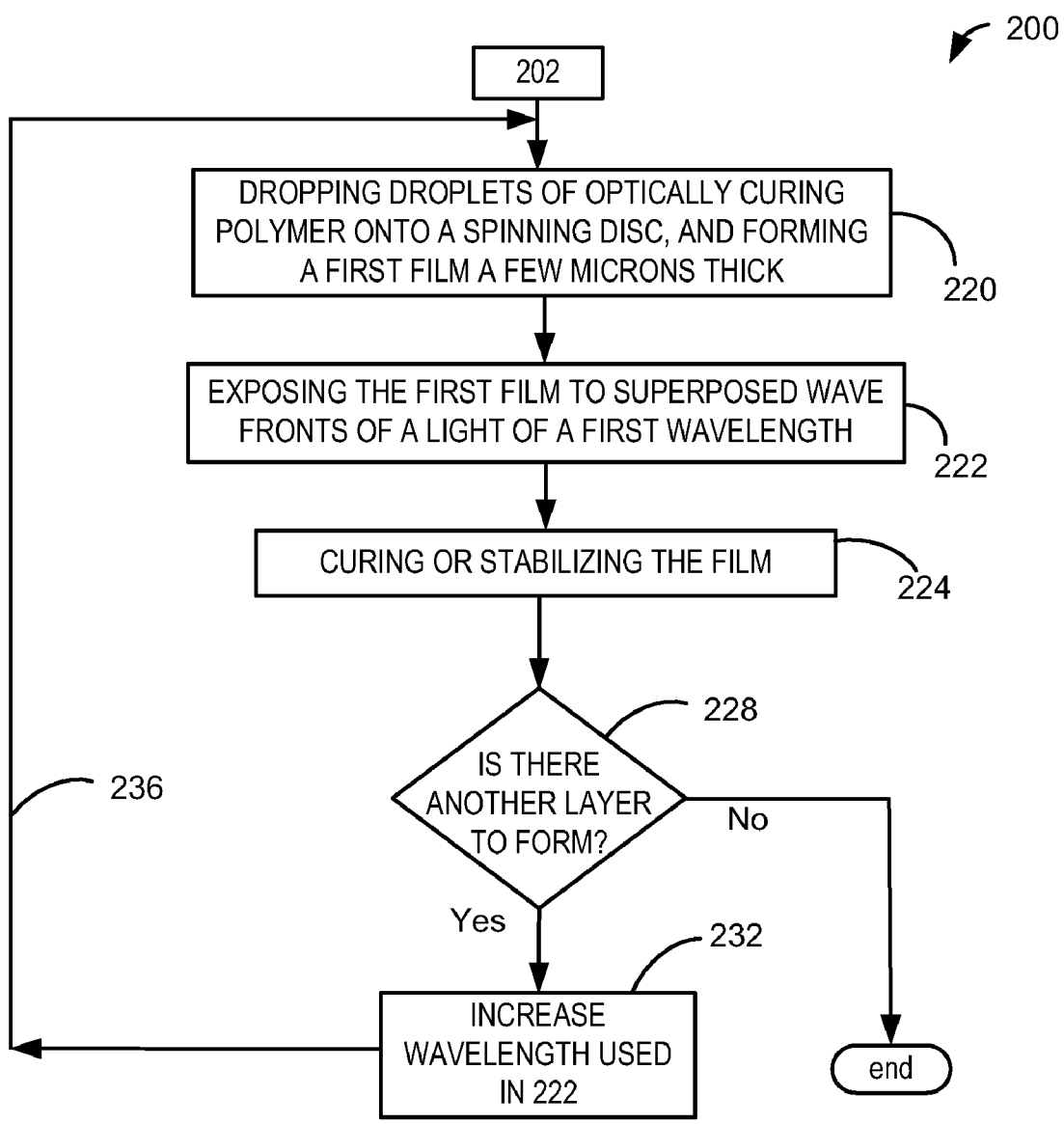

FIG. 13 is a flowchart illustrating another example variation of the method 200. The method 200 may include, at 220, dropping droplets of optically curing polymer onto a spinning disc, and forming a first film a few microns thick. The method 200 may also include, at 222, exposing the first film to superposed wave fronts of a light of a first wavelength. The method 200 may also include, at 224, curing or stabilizing the film. In addition the method 200 may also include, forming more layers selectively, as illustrated with decision block 228, and iteratively as illustrated with arrow 236. The operations may include depositing a second film onto the first film by repeating the dropping 220, the exposing 222, and the curing 224. As illustrated with block 232, the exposing 222 may be altered by exposing the second film to a light of a second wavelength slightly greater than the first wavelength. The method may further include, repeating the dropping 220, the exposing 222, and the curing 224 wherein the exposing is further altered by exposing subsequent films to a light of subsequent wavelength being slightly greater than a wavelength used in the exposing of an immediately underlying layer.

Figure 14:
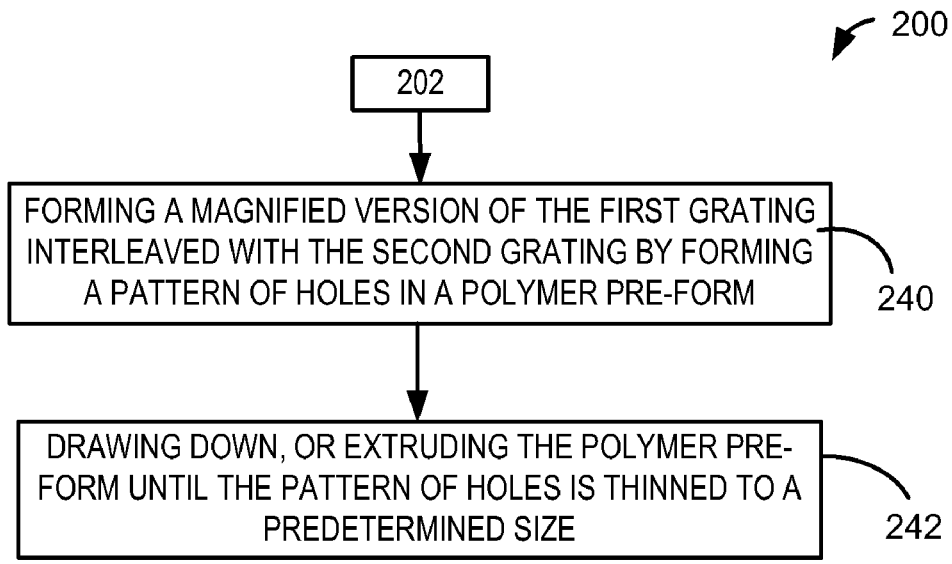

FIG. 14 is a flowchart illustrating another example variation of the method 200. The method 200 may include, at 240, forming a magnified version of the first grating interleaved with the second grating by forming a pattern of holes in a polymer pre-form. The method 200 may also include, at 242, drawing down, or extruding the polymer pre-form until the pattern of holes is thinned to a predetermined size.

Figure 15:
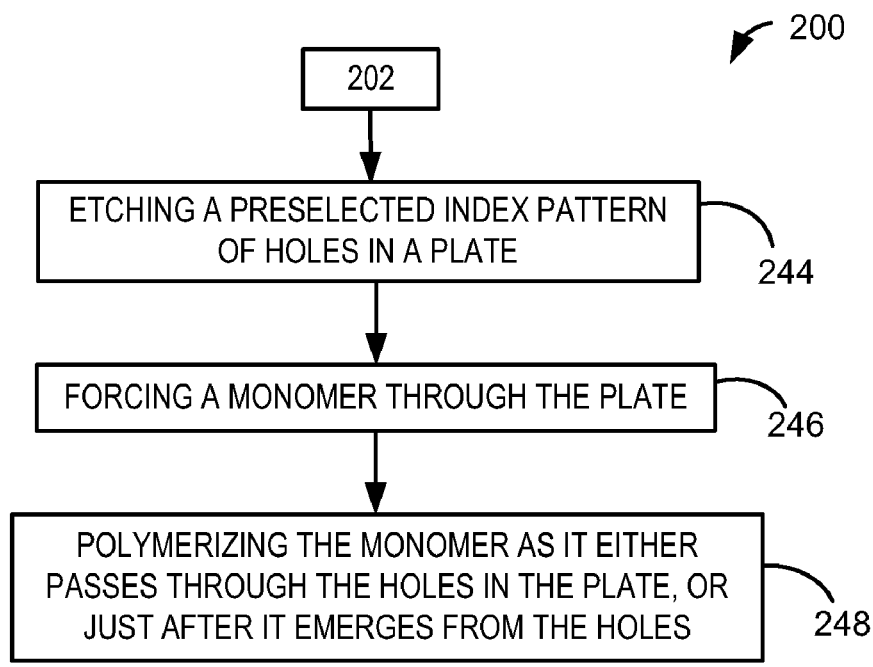

FIG. 15 is a flowchart illustrating another example variation of the method 200. The method 200 may include, at 244, etching a preselected index pattern of holes in a plate. The method 200 may also include, at 246, forcing a monomer through the plate. The method 200 may also include, at 242, polymerizing the monomer as it either passes through the holes in the plate, or just after it emerges from the holes.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

The invention claimed is:

1. An end reflector for a thick end of a flat-panel lens, the flat-panel lens having also a thin end and central plane, the end reflector comprising:
   a first grating having a first set of parallel planes of alternating refractive indices disposed at a first angle with respect to the central plane; and
   a second grating having a second set of parallel planes of alternating refractive indices disposed at a second angle with respect to the central plane, the second angle being equal to the first angle reflected in the central plane, a spacing between adjacent planes of each of the first and second gratings increasing by a preselected amount with distance from the thick end in a direction opposite the thin end.

2. The end reflector of claim 1 wherein each of the first and second gratings comprises a Bragg grating of varying pitch.

3. The end reflector of claim 2 wherein the pitch of each Bragg grating varies in steps, with two or more groups of parallel planes sharing the same pitch within each group.

4. The end reflector of claim 1 wherein the first and second gratings are superposed in the same material.

5. A flat-panel lens comprising:
   an optically transmissive, wedge-shaped light guide having a front surface for receiving or projecting light, a back surface opposite the front surface, a thick end and a thin end each adjacent to the front and back surfaces, and a central plane passing between the front and back surfaces, and
   a reflector arranged at the thick end of the light guide, the reflector including interleaved first and second gratings, the first grating having a first set of parallel planes of alternating refractive indices disposed at a first angle with respect to the central plane, the second grating having a second set of parallel planes of alternating refractive indices disposed at a second angle with respect to the central plane, the second angle being equal to the first angle reflected in the central plane.

6. The flat-panel lens of claim 5, wherein the first angle relative to a surface of the thick end is substantially equal to half the difference between 90 degrees and a critical angle for total internal reflection in the light guide.

7. The flat-panel lens of claim 5, wherein the first and second gratings are formed from holes drilled in a pre-form in a pre-form pattern, the pre-form pattern being similar to, but larger than, a final pattern corresponding to locations of intersections of the first parallel planes and the second parallel planes, the pre-form being then stretched in a direction parallel to an axis of one of the holes to reduce the pre-form pattern, as measured in a plane normal to the axis of one of the holes, to form the final pattern.

8. The flat-panel lens of claim 5, wherein the first and second gratings include polymerized filaments arranged in a pattern corresponding to locations of intersection of the parallel planes of the first set and the parallel planes of the second set, the filaments being formed from a monomer that has been forced through holes in a plate.

9. The flat-panel lens of claim 5, wherein the first and second gratings include a series of stacked films of an optically cured polymer sequentially dropped onto a spinning disc, the stacked films having been exposed to superposed plane waves in sequence after each respective polymer has been dropped onto the spinning disc, the superposed plane waves having a wavelength being selectively increased according to a height of the stacked films.

10. The flat-panel lens of claim 5 wherein each of the first and second gratings comprises a Bragg grating.

11. The flat-panel lens of claim 5 wherein each of the first and second gratings has a variable pitch, so that different wavelengths of light penetrate the reflector to different depths before being reflected.

12. The flat-panel lens of claim 5 wherein the reflector is configured to reflect towards the thin end light received at the thick end.

13. The flat-panel lens of claim 5 wherein each light ray received at the thick end at a positive angle from the central plane is reflected off the first grating, and each light ray received at the thick end at a negative angle from the central plane is reflected off the second grating.

14. The flat-panel lens of claim 5 wherein a pitch of each grating is sufficient to reflect a ray of blue light incident normal to the grating within 5 microns of the thick end.

15. The flat-panel lens of claim 14 wherein the pitch of each grating is increased at 5 or more microns from the thick end, such that each grating reflects blue light incident oblique to the grating and greener light normal to the grating.

16. The flat-panel lens of claim 15 wherein the pitch of the first grating and the pitch of the second grating are increased equally.

17. A flat-panel lens comprising:
   a light guide made from an optically transmissive material and having a wedge-shaped profile, a thick end, a thin end, and a central plane, and
   at the thick end of the light guide, a reflector including first and second interleaved gratings configured so that different wavelengths of light penetrate the reflector to different depths before being reflected, the first grating having a first set of parallel planes of alternating refractive indices disposed at a first angle with respect to the central plane, the second grating having a second set of parallel planes of alternating refractive indices disposed at a second angle with respect to the central plane, the second angle being equal to the first angle reflected in the central plane, a spacing between parallel planes of the first set and between parallel planes of the second set both increasing with increasing distance from the thick end in a direction opposite the thin end.

18. The flat-panel lens of claim 17 wherein the first set includes two or more groups of parallel planes with equal spacing within each group, wherein the second set includes two or more groups of parallel planes with equal spacing within each group, and wherein a first group arranged closer to the thick end shares a tighter group spacing than a second group arranged farther from the thick end, for each of the first and second sets.

19. The flat-panel lens of claim 18, wherein the two or more groups of parallel planes are comprised of five groups of parallel planes.

20. The flat-panel lens of claim 17 wherein increasing with increasing distance comprises increasing gradually.

\* \* \* \* \*